Oct. 21, 1958 H. L. MARTE 2,856,626
WINDSHIELD CLEARING SYSTEM
Filed Aug. 14, 1952
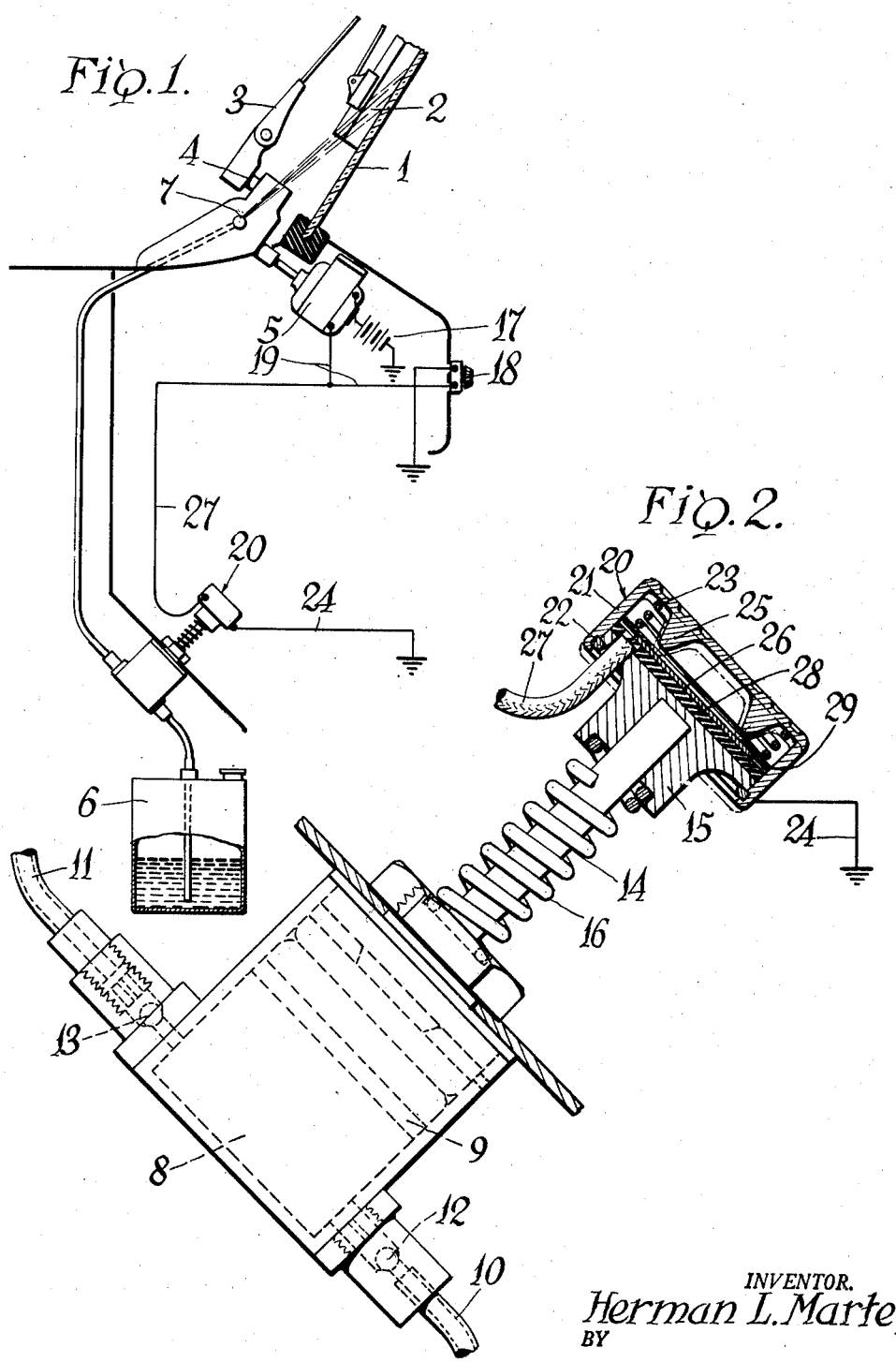
INVENTOR.
Herman L. Marte,
BY
Bean, Brooks, Buckley + Bean.
ATTORNEYS.

United States Patent Office 2,856,626
Patented Oct. 21, 1958

2,856,626

WINDSHIELD CLEARING SYSTEM

Herman L. Marte, Columbus, Ohio, assignor to Trico Products Corporation, Buffalo, N. Y.

Application August 14, 1952, Serial No. 304,406

16 Claims. (Cl. 15—250.4)

This invention relates to the windshield cleaning art and particularly to an arrangement in which a liquid solvent is applied to the windshield surface conjointly with the use of an oscillating wiper by which the fluid solvent may be spread over the windshield surface and the latter wiped clean to leave a clear field of vision.

It has heretofore been proposed to combine the functions of an electric windshield cleaner and a washer, an example of which may be seen in Patent No. 2,162,985.

More recently it has been proposed to apply the solvent to a windshield surface through a foot actuated pump and thereafter, by a separate operation, to bring the windshield wiper into use, such use to be discontinued at the will of the motorist.

The object of the present invention is to provide a windshield cleaner system of this character in which the fluid solvent is sprayed onto the windshield by a foot controlled instrumentality that is common to a windshield wiper to bring them jointly into action, the two windshield cleaning agencies being successively energized for a substantially concurrent use.

A further object of the invention is to provide a combined windshield cleaner and washer in which a foot actuated control for the washer incorporates a novel switch control means for bringing the wiper into use concurrently with the washer unit.

The foregoing and other objects will manifest themselves as this description progresses wherein reference is made to the accompanying drawing, in which Fig. 1 is a diagrammatic view showing the improved windshield cleaning installation; and Fig. 2 is an enlarged sectional view through the pump and the combined control unit.

Referring more particularly to the drawing, the numeral 1 designates the windshield of a motor vehicle having a wiper 2 carried by an actuating arm 3 which in turn is oscillated by the shaft 4 of a motor 5 preferably of the electric type.

The washer unit comprises a reservoir 6 for the liquid solvent, a nozzle 7 for directing the liquid spray onto the windshield, and an interposed pump having a chamber 8 and a liquid displacing member, such as the plunger 9, the chamber being connected to the reservoir by conduit 10 and to the nozzle by conduit 11 having suitably arranged inlet and outlet valves 12 and 13, respectively. The liquid displacing member 9 is provided with a stem 14 having a head 15 designed to receive the pressure of the foot in depressing the plunger against the urge of a spring 16 for expressing the liquid solvent out through the conduit 11 and the nozzle 7 into the path of the wiping blade 2 on the windshield.

The electric windshield cleaner motor 5 may be connected in circuit with a source of electric energy 17 and a hand switch 18 by wiring 19.

In accordance with the present invention, means are provided to bring the windshield wiper into use concurrently with the operation of the washer, or substantially so. Accordingly, a secondary windshield cleaner control in the form of a foot switch 20 is interposed in the circuit 19 and so arranged as to close the motor circuit whenever the plunger is depressed. In the illustrated embodiment, such switch is yieldably mounted upon the head 15 and embodies a tread member 21 in the form of a cap that is inverted over the head and retained from displacement by a ring 22. A spring 23 is arranged within the hollow tread member to yieldably support the latter off the head 15 in normally holding the switch open. The tread cap 21 is preferably metallic and through the pump is grounded as indicated at 24. Its under face is formed with ring-shaped contact 25 serving to hold the spring 23 properly positioned. This annular contact is designed for being depressed into electrical contact with a contact plate 26 which in turn is connected to the electrical source 17 by a wire 27. The contact plate is insulated from the head by a disk 28 of insulation, while an insulating ring 29 supports the spring 23.

The spring 23 is lighter than the spring 16 to yield initially for closing the electric circuit first and, thereafter, the collapsed head-assembly 15, 21, will be depressed as a unit to express the liquid solvent from the chamber 8. The removal of the foot pressure will permit the springs 16 and 23 to simultaneously arrest the wiper and the spray. Since the spring 23 is relatively light it is possible to maintain the wiper in operation following the termination of the spray by lightly pressing the foot upon the tread cap.

In operation, for wiping during rainy weather the primary control switch 18 will be closed to operate the windshield cleaner alone. At other times, to remove vision obscuring matter from the field of vision the motorist will simply depress the composite head assembly or button to close the secondary switch, and the including windshield cleaner circuit, and simultaneously eject the solvent onto the windshield. This depression causes the windshield cleaner and washer to be operated successively, though practically in a concurrent manner, to secure the conjoint use. Upon relieving the foot pressure, the spray will terminate and the wiper return to a parked position of rest by an electric cleaner parking means of suitable design.

The arrangement provides a simple means for enabling the motorist to perform a minimum number of operations to obtain clear vision, and while the foregoing description has been given in detail it is without throught of limitation since the inventive principles involved are capable of assuming other physical embodiments without departing from the spirit of the invention and the scope of the appended claims.

What is claimed is:

1. A windshield cleaning system comprising a washer having a pump with a foot actuated liquid displacing member depressible to eject solvent onto an associated windshield, a tread member adapted for foot pressure operation resiliently mounted on said displacing member and operable for being depressed first independently of said displacing member and subsequently jointly therewith for washer operation, a windshield wiper and a control therefor, and means operable by such independent depression of said tread member to actuate said control for starting said wiper substantially concurrently with ejection of the solvent by said pump.

2. A windshield cleaning system comprising an electrically operated windshield wiper motor having energizing circuit means including primary and secondary switch control means remotely located and independently operable in relation to each other, a windshield washer pump for the delivery of washing fluid, foot actuated control means for applying operating pressure to said pump including means for operating said secondary switch control means whereby pressure applied to operate said pump for the delivery of fluid will close, and subsequent release of such pressure will reopen said circuit means for said wiper motor, said secondary switch control means acting to close said circuit means prior to operating pressure being applied to said pump.

3. A windshield cleaning system comprising a washer having a pump with a foot actuated liquid displacing member depressible to eject solvent onto an associated windshield, said displacing member resiliently acting under pressure also as an auxiliary switch element to complete an electric circuit to energize a wiper motor while fluid is being ejected, and switch means remotely located to maintain the wiper operation independent of and without interference by said displacing member action.

4. A windshield cleaning system comprising a pump with a foot actuated control member depressible for causing said pump to eject a predetermined quantity of solvent onto a windshield, a tread member adapted for foot pressure operation resiliently mounted on said control member and operable for being initially depressed independently of said control member and subsequently depressed jointly therewith, a windshield wiper and a control therefor, and means operable by such independent depression of said tread member to actuate said wiper control for starting said wiper substantially concurrently with the ejection of solvent by said pump.

5. A windshield cleaning system comprising a pump having a foot actuated control member depressible to cause ejection of a predetermined quantity of washing fluid by said pump, a tread member adapted for foot pressure operation resiliently mounted on said control member for being initially depressed thereagainst and then jointly therewith to actuate said pump, an electric wiper motor and a wiper connected thereto for being driven thereby, and energizing circuit means for said motor including normally open separate switch means independently operable to close said energizing circuit means for actuating said motor, one of said switch means being automatically closable by such initial depression of said tread member.

6. A windshield cleaning system comprising a washer having a pump with a foot actuated liquid displacing member, a tread member resiliently mounted on said displacing member to form a depressible unit and operable to be initially depressed independently thereof and, thereafter, through a continued depression of said tread member, to be depressed jointly with said displacing member, a windshield cleaner comprising an electric motor having a wiper and a control switch in circuit with the motor, and a second switch also in circuit with the motor but in shunt relation with the first switch and operable by said depressible unit to close the motor circuit and to maintain the motor energized during the ejection of the solvent to coordinate the wiper operation with the liquid application.

7. A windshield cleaning system comprising a washer having a pump with a foot actuated liquid displacing member having a head and depressible to eject solvent onto an associated windshield, a tread member adapted for foot pressure operation resiliently mounted on said head for being depressed, a normally open switch interposed between said head and said tread member and closable by depressing the latter, and a windshield cleaner motor having a wiper and being in circuit with said switch for energizing the cleaner motor upon the closing of the switch.

8. A windshield cleaning system comprising a washer having a pump with a foot actuated liquid displacing member having a head and depressible to eject solvent onto an associated windshield, a tread member adapted for foot pressure actuation movably mounted on said head for being depressed thereon, a normally open switch interposed between said head and said tread member and closable by depressing the latter on said head, a return spring for said liquid displacing member, a relatively lighter spring normally holding said switch open, whereby upon the application of pressure on said tread member said relatively lighter spring is adapted to yield before said return spring to close said switch prior to depression of said displacing member, and a windshield cleaner motor having a wiper and being in circuit with said switch for energizing the cleaner motor upon the closing of the switch.

9. A windshield cleaning system comprising a washer having a pump with a foot actuated liquid displacing means depressible on one stroke to eject solvent onto an associated windshield and having a spring-returned intake stroke, a wiper, a motor for operating the latter, a switch operable initially by said displacing means on said ejection stroke to complete an electric circuit to energize the wiper motor while fluid is being ejected, and other switch means in circuit with the wiper motor and being remotely located to secure a wiper operation independently of said displacing means, said switch being closed by the foot pressure at the start of the ejection stroke and opened upon the release of foot pressure.

10. A windshield washer and wiper system comprising a pump mechanism having plunger means operable by manual pressure and depressible to eject a washing liquid onto an associated windshield and a return stroke to intake a fresh charge of liquid, a windshield wiper, a motor connected for operating the wiper, a motor energizing switch connected in circuit to control the motor and operated by the pump mechanism, the switch having a part movable to a circuit closing position at the start of the ejection stroke of the plunger means to have the wiper operating concurrently with the liquid delivery, and resilient means acting to return the plunger means upon the release of manual pressure, after which said switch is opened.

11. A windshield cleaning system comprising an electrically operated windshield wiper motor having energizing circuit means, including primary and secondary switches independently closable to energize the motor, a windshield washer pump having a liquid displacing means operable by manual pressure, a conduit connected to said pump and extending to a position adjacent the windshield, said displacing means being depressible on one stroke to force washing liquid through said conduit and deliver the same onto an associated windshield and operating substantially concurrently therewith the close said secondary switch, said liquid displacing means being operable upon the release of manual pressure to intake a fresh charge of liquid and open said secondary switch.

12. For use with a vehicle having a windshield wiping unit including a wiper and an electrical motor for operating said wiper, and a windshield washing unit including a nozzle and a pump assembly including a pump plunger for supplying fluid under pressure to said nozzle in which the fluid is supplied to the nozzle in response to an axial movement of the pump plunger, a control switch in circuit with said motor, said switch including an actuating member mounted on said plunger and movable relative to said plunger for controlling the operation of said motor, said actuating member being movable as a unit with said plunger providing for the supply of fluid under pressure to said nozzle.

13. For use with a vehicle having a windshield wiping unit including a wiper and an electric motor for operating said wiper, and a windshield washing unit including a nozzle and a pump for supplying fluid under pressure to said nozzle in which the fluid is supplied to the nozzle in response to operation of the pump, operator actuated control means for said pump, an operator actuated control switch in circuit with said motor, said control switch being connected to said pump control means and movable relative thereto, both said controls being movable as a unit for supplying fluid under pressure to said nozzle and actuating said wiper, and said operator actuated control switch being movable independently of said operator actuated control means for said pump to start said wiper independently of said pump.

14. For use with a vehicle having a windshield wiping unit including an electric motor for operating said wiper, and a windshield washing unit including a nozzle and a pump having a limited cycle of operaton for supplying fluid under pressure to said nozzle, operator actuated control means for said pump, an operator actuated control switch means in circuit with said motor, play connecting means engaging a portion of said control switch means and connecting both said controls together so that said control switch means may be operator actuated independently of said pump control means to start said wiper independently of said pump and movement of said connecting means operates said controls as a unit for conjoint operation of said pump and motor.

15. A windshield cleaner according to claim 13, wherein said operator actuated control switch for said wiper will continue said wiper in operation until operator released.

16. A windshield cleaner according to claim 14, wherein said conjoint operation is initiated by a single unidirectional motion and said connecting means enables the continued operation of the wiper after the delivery of the pump ceases.

References Cited in the file of this patent
UNITED STATES PATENTS

| | | |
|---|---|---|
| 2,126,624 | Eaddy | Aug. 9, 1938 |
| 2,162,985 | West | June 20, 1939 |
| 2,323,470 | Horton et al. | July 6, 1943 |
| 2,632,471 | Horton | Mar. 24, 1953 |

UNITED STATES PATENT OFFICE
CERTIFICATE OF CORRECTION

Patent No. 2,856,626　　　　　　　　　　　　　　　October 21, 1958

Herman L. Marte

It is hereby certified that error appears in the printed specification of the above numbered patent requiring correction and that the said Letters Patent should read as corrected below.

Column 2, line 12, after "with" insert -- a --; line 46, for "throught" read -- thought --; column 4, line 47, for "the" read -- to --.

Signed and sealed this 13th day of January 1959.

(SEAL)
Attest:

KARL H. AXLINE
Attesting Officer

ROBERT C. WATSON
Commissioner of Patents